United States Patent
Haddad et al.

[19]

[11] Patent Number: 6,095,797
[45] Date of Patent: Aug. 1, 2000

[54] QUICK CHANGE PILOT ASSEMBLY AND METHOD OF ASSEMBLY

[75] Inventors: Nabil Haddad; Douglas Jackman, both of Garden Grove, Calif.

[73] Assignee: Robertshaw Controls Company, Richmond, Va.

[21] Appl. No.: 09/111,533

[22] Filed: Jul. 8, 1998

Related U.S. Application Data

[60] Provisional application No. 60/078,847, Mar. 20, 1998.

[51] Int. Cl.$^7$ ................................................... F23D 11/36
[52] U.S. Cl. .......................... 431/154; 431/156; 431/343
[58] Field of Search ..................... 431/154, 156, 431/343, 30; 285/368

[56] References Cited

U.S. PATENT DOCUMENTS

| | | |
|---|---|---|
| 1,516,397 | 11/1924 | Mueller et al. . |
| 1,725,975 | 8/1929 | Bystricky . |
| 2,236,031 | 3/1941 | Hall . |
| 2,450,170 | 9/1948 | Smith . |
| 2,456,203 | 12/1948 | Loepsinger . |
| 2,757,945 | 8/1956 | Bingham . |
| 3,058,760 | 10/1962 | Bankowski . |
| 3,072,421 | 1/1963 | Lloyd et al. . |
| 3,164,890 | 1/1965 | Schmohl . |
| 3,365,219 | 1/1968 | Nicolaus . |
| 3,367,684 | 2/1968 | Anderson . |
| 3,741,166 | 6/1973 | Bailey ..................................... 431/156 |
| 3,913,846 | 10/1975 | Morris ..................................... 431/354 |
| 4,346,919 | 8/1982 | Morrill ..................................... 285/25 |
| 4,346,923 | 8/1982 | Smith et al. ........................... 285/340 |
| 4,678,428 | 7/1987 | Tanaka et al. ............................. 431/76 |
| 5,339,630 | 8/1994 | Pettit ......................................... 60/303 |
| 5,551,867 | 9/1996 | Shamp ................................... 431/343 |

FOREIGN PATENT DOCUMENTS

| | | | |
|---|---|---|---|
| 1201649 | 3/1986 | Canada ................................. 431/343 |

*Primary Examiner*—Ira S. Lazarus
*Assistant Examiner*—Sara Clarke
*Attorney, Agent, or Firm*—Terence Martin; Jules J. Morris; Sean D. Detweiler

[57] ABSTRACT

A quick change pilot assembly (10) includes a pilot mounting plate (13) for securing the assembly to an appliance. A hood mounting plate (7) is detachable from the pilot mounting plate. A pilot hood (6) has at one end a flange (12) carried in an aperture of the hood mounting plate. A compressible member (3) has a central aperture and is disposed between the pilot mounting plate and the hood mounting plate. The compressible member is disposed to allow fuel to flow therethrough. An outer sleeve (11) and fitting receiving member (9) are sealingly affixed to the pilot mounting plate at a distal end thereof through an aperture in the pilot mounting plate, the circular compressible member, and the hood mounting plate aperture to the pilot hood. A lock sleeve assembly (2) is disposed within the outer sleeve and fitting receiving member. At one end, the lock sleeve assembly abuts and engages the compressible member central aperture. The lock sleeve also carries an orifice member (1). A fitting (8) is received within the outer sleeve and fitting receiving member. A compression seal (14) is disposed between the fitting and the proximal end of the orifice member.

6 Claims, 3 Drawing Sheets

QUICK CHANGE PILOT ASSEMBLY AND METHOD OF ASSEMBLY

This application claims the benefit of Provisional Application Ser. No. 60/078,847 filed Mar. 20, 1998.

TECHNICAL FIELD

The present invention relates to pilot assembly for fuel burners, and especially to easily exchangeable pilot assemblies.

BACKGROUND OF THE INVENTION

Problems have been encountered in changing appliances, etc. (especially gaseous fuel appliances and gas fireplaces/fireplace log sets) from natural gas to LP or other fuel. This is due to the fact that the existing designs for pilot assemblies are normally supplied from the factory with an installed pilot assembly designed for the intended fuel use and are not conducive to rapid changeover to another fuel nor to field replacement. A need for an easily convertible/replaceable pilot assembly has long existed.

The following US Patent references are noted:

U.S. Pat. No. 3,913,846: discloses a gas orifice 30 and gas supply pipe 28 sealingly secured by mounting socket 22, compression nut 24, and compression fitting 26. See FIG. 1.

U.S. Pat. No. 5,339,630: discloses a fuel nozzle and a sealing member, such as copper washer 106, placed between air housing 82 and shoulder 108 of the nozzle to create a sealing interface. See FIG. 2.

U.S. Pat. No. 3,367,684: discloses a pressure tube-to-pipe fitting including a fitting body 10, a nut 12, and a two-part integral locking ring and gasket assembly 14. When tube section 16 is attached to body 10, fitting 18, and gas distribution pipe 20, there is attached a sealed, leak-proof connection which will not pull apart. See FIG. 3. Further, see column 2, lines 70–72, column 3, lines 58–75 and column 4, lines 1–10.

U.S. Pat. No. 4,678,428: discloses a fuel burner with a gas supply base 16 having a nozzle 3 mounted by a rubber packing 17 on base 16 under compression forces exerted by ring-shaped coupling member 4.

U.S. Pat. No. 3,365,219: discloses a pressure fitting for a tube joint. Fitting 10, nut 12, frusto-conical locking ring 14, sealing ring 16, and thrust washer 18 are employed for the attachment of tube 20 to gas pipe 24. See FIGS. 1, 2, and 5. See column 3, lines 43–52.

U.S. Pat. No. 3,072,421: discloses a coupling assembly including washer 7 in nipple 17 with the base of the washer abutting flange 12. See FIGS. 1–4.

U.S. Pat. No. 2757945: discloses a sealed pipe joint member 10 including apertured member 12, pipe 16, and spring steel, truncated-cone locking washer 14. See FIGS. 1 and 2.

U.S. Pat. No. 2,456,203: discloses a coupling for a tubular member. Nut 16 is threadedly coupled to body 14. The body has a shoulder for receiving resilient washer 18 for sealing between tube 12 and the body. See FIG. 3.

U.S. Pat. No. 2,450,170: discloses a nut 10, pipe 13, and sealing washer 31 for sealing between pipe 13 and shoulder 28. See FIG. 1.

U.S. Pat. No. 5,551,867: discloses a furnace conversion unit with a compression member 18. See FIG. 4.

U.S. Pat. No. 3,164,890: discloses a packing retainer 8 assembled on coupling member 2 with boss 1. See FIGS. 1, 2, and 5–7.

The following US Patent references may also be of interest: U.S. Pat. Nos. 4,346,923, 4,346,919, 1,725,975, 1,516,397, 3,058,760, and 2,236,031.

SUMMARY OF THE INVENTION

The present invention rearranges the mounting configuration of the pilot assembly such that the replacement or conversion is made possible from a front or top access door of the appliance. The orifice of the existing pilot assembly was heretofor not easily accessible after the pilot assembly was installed in the appliance. Replacement or retrofit can require the complete removal of the pilot assembly to make the repair or gas changeover conversion, as access to the back side of the assembly where conventionally installed is usually limited at best or nonexistent. This may be especially true with fireplaces and fireplace logs. Importantly, (gaseous) leak-free connection to the fuel supply is ensured due to a unique compression connection, of predetermined or preset compression force, which is readily and automatically duplicated during field conversion and/or replacement. This compression connection is enabled by use of a disc spring element, also known as a Belville washer or spring, to provide the spring-based compression force.

The present invention advantageously includes a removable hood which permits direct access to the gas orifice. It employs a compressible member, such as the disc spring (or any equivalent functional member) to exert the same coupling connection pressure when torqued to a factory preset or factory predetermined value.

BRIEF DESCRIPTION OF THE DRAWING FIGURES

DETAILED DESCRIPTION OF THE PREFERRED EMBODIMENT

Figure 1:
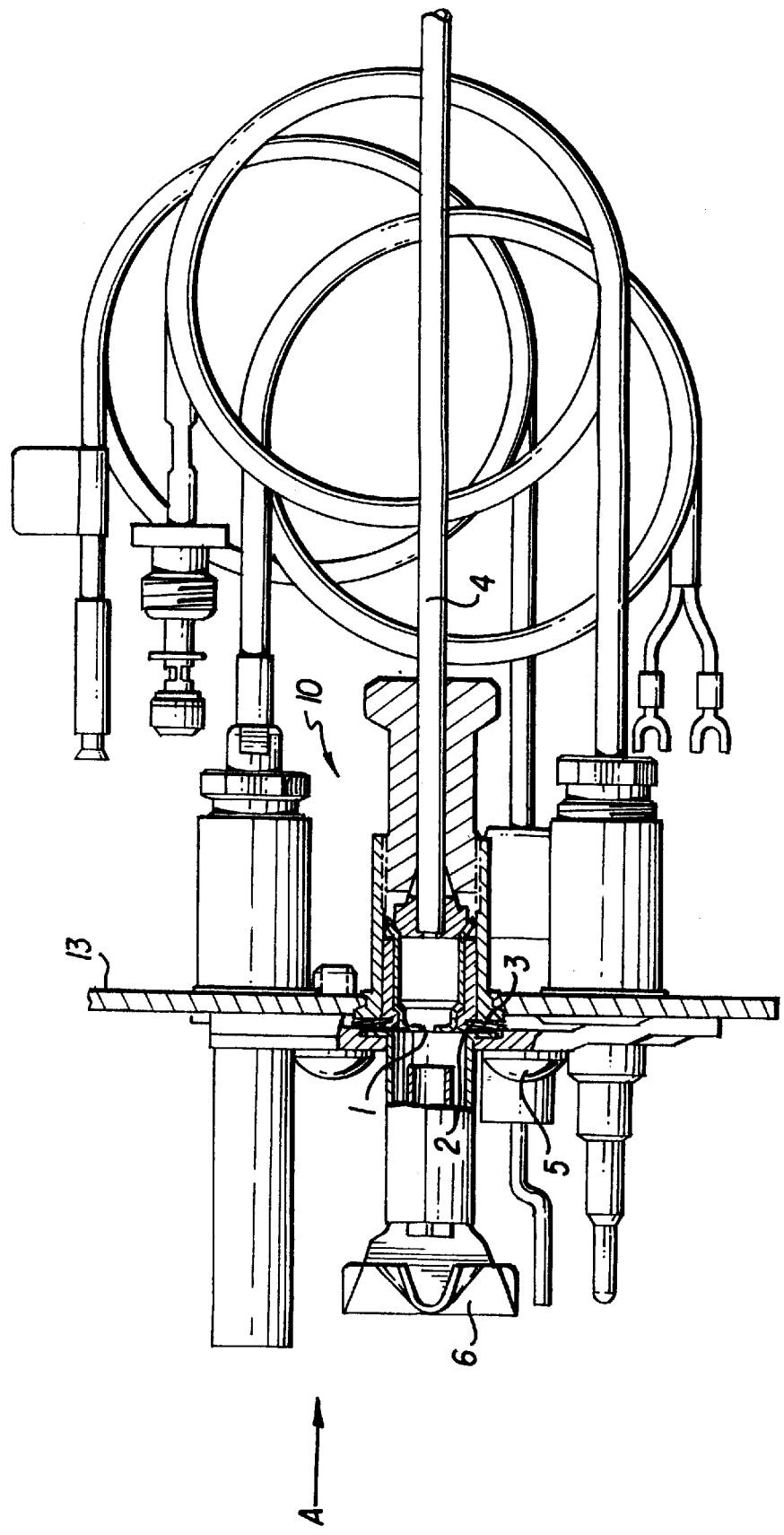
FIG. 1 is a side view of a quick change pilot assembly according to one illustrative embodiment of the present invention (selected portions being shown in cross section)
Figure 2:
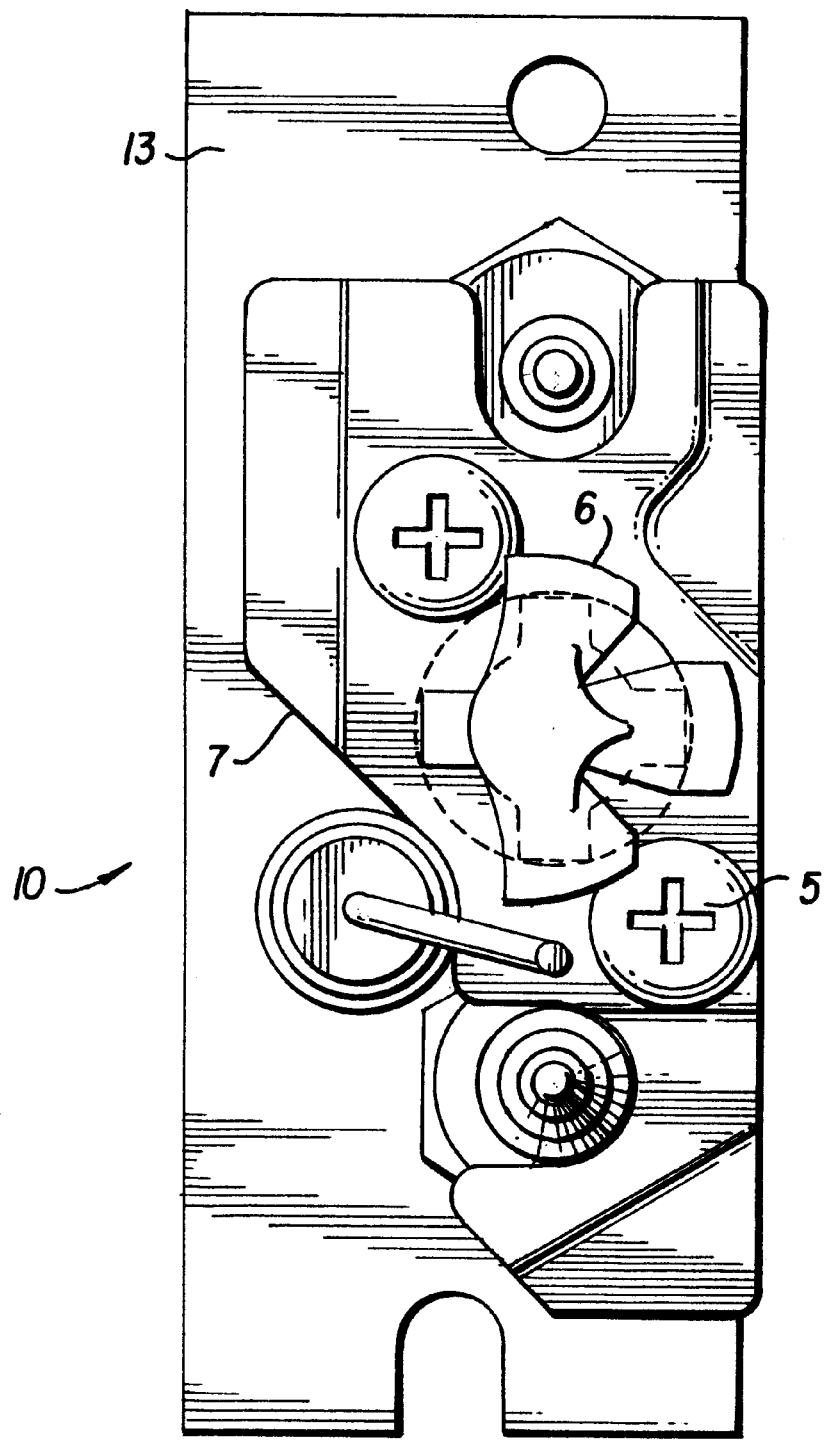
FIG. 2 is an end view of the device of FIG. 1 as seen from the direction indicated by arrow "A" (selected portions being shown in dotted line outline form)
Figure 3:
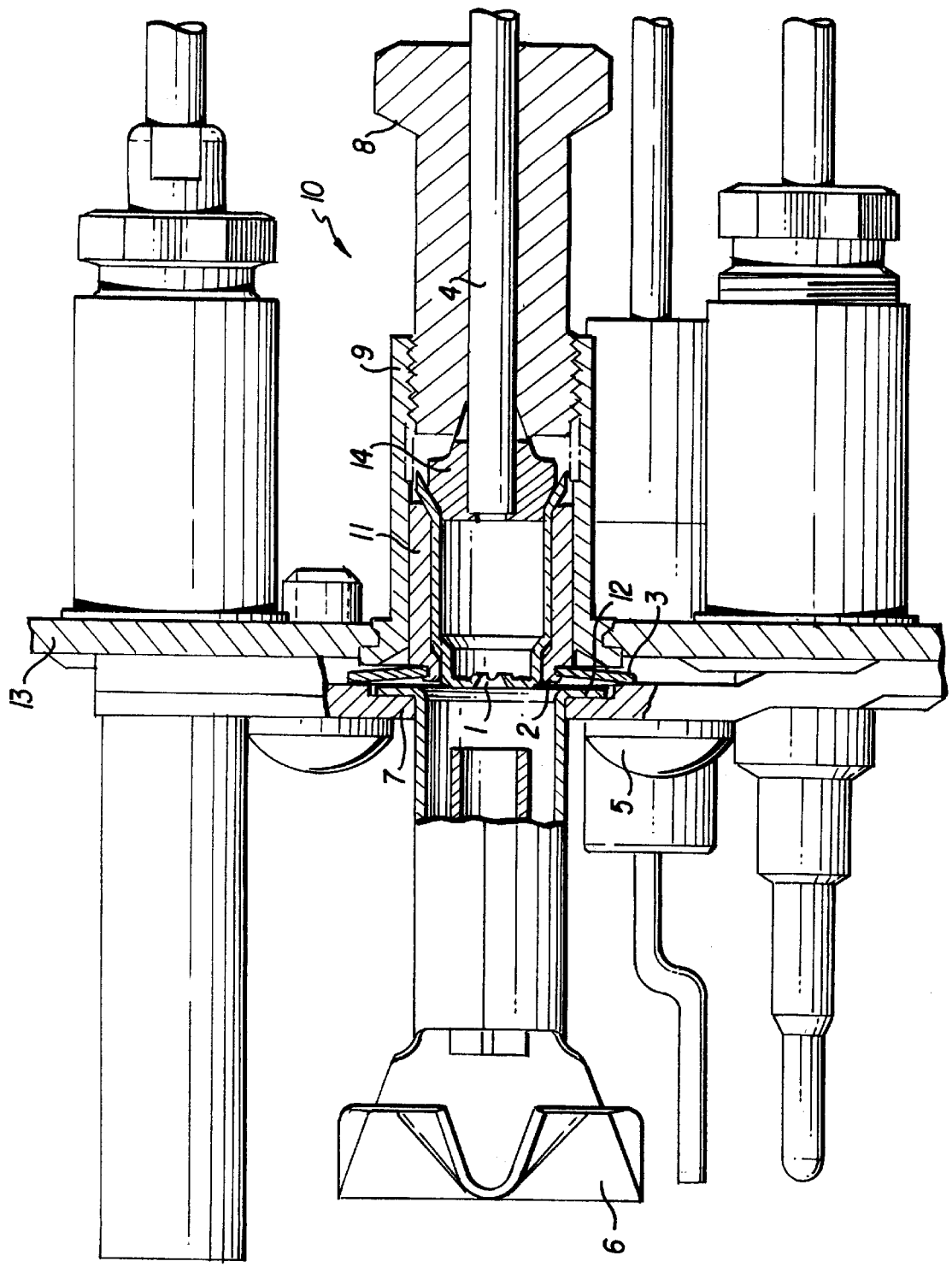
FIG. 3 is an enlarged view of selected portions of FIG. 1.

Referring now to FIGS. 1–3, a quick change pilot assembly 10 according to the present invention is shown. The assembly 10 is secured to a pilot mounting plate 13 or the like for securing the entire pilot assembly to the appliance (not shown).

The orifice member 1 is easily accessible after the removal of two screws 5 and the hood mounting plate 7. As shown in FIGS. 1–3, the orifice 1 or spud (which may be made of stainless steel or other high temperature material) is retained by a lock sleeve assembly 2 which incorporates a disc spring 3 to maintain a compression force on the orifice to the pilot line 4 connection. The lock sleeve assembly 2 includes a generally tubular sleeve member 11 disposed inside an outer sleeve and fitting receiving member 9. Orifice member 1 is sealed, secured inside, and carried by sleeve 11 to provide a gas-tight seal thereof. Member 9 is joined to and forms an integral part of the pilot mounting plate 13. The fitting 8 and orifice member 1 are sealed to inner sleeve member 11 by compressive forces applied to ball sleeve 14 by fitting 8.

This inner tubular sleeve member includes a distal end configured to abut disc spring 3 and thus seal the orifice member to a radially outwardly flanged portion 12 of the pilot hood 6 with a compression force value determined by the disc spring 3 and torque force with which fitting 8 is secured within sleeve and fitting receiving member 9. The flanged portion 12 may be secured to the hood mounting plate, as by welding, etc.

During the factory assembly operation, the orifice member I is inserted from the back side of the pilot assembly 10, after the front (normally unaccessible) side components (pilot hood 6, hood mounting plate, lock sleeve, etc.) have been attached. The pilot line 4 is then attached and the fitting 8, easily accessible from the back side, is tightened to the proper torque.

The lock sleeve assembly 2 which retains the orifice can thereafter be removed at any time, from the other side, by removing the mounting screws and hood mounting plate. When the orifice 1 is replaced and the locking sleeve, hood mounting plate 7, and screws 5 are then re-assembled, the disc spring 3 compresses and exerts the same amount of pressure on the orifice as was preset during the factory assembly torquing operation.

The purpose of this invention is to allow one to quickly and easily repair or convert a fireplace or other appliance from natural gas to LP gas, even after the pilot assembly is already installed in the appliance. This invention addresses safety issues by ensuring that a leak-free connection is maintained between the orifice and the pilot line. This provides after-market personnel with the flexibility of making a conversion at their facility or on units already installed in the field.

This novel design allows the conversion to be made from the front (or top) access door of the appliance. The amount of compression required for proper sealing at the orifice to pilot line connection, which is preset during our factory assembly operation, is automatically duplicated when the conversion is completed.

We claim:

1. A quick change pilot assembly, comprising,
   a) a pilot mounting plate;
   b) a hood mounting plate detachable from the pilot mounting plate;
   c) a pilot hood having at one end a flange carried in an aperture of the hood mounting plate;
   d) a compressible member having a central aperture and being disposed between the pilot mounting plate and the hood mounting plate and so disposed adjacent the hood mounting plate as to permit fuel flow therethrough;
   e) an outer sleeve and fitting receiving member sealingly affixed to the pilot mounting plate at a distal end thereof through an aperture in the pilot mounting plate, the circular compressible member, and the hood mounting plate aperture to the pilot hood;
   f) a lock sleeve member disposed within the outer sleeve and fitting receiving member, adapted at a first end to abut and engage the compressible member central aperture, the lock sleeve member further carrying an orifice member therein;
   g) fitting receivable within the outer sleeve and fitting receiving member at a proximal end thereof; and
   h) a compression seal element disposed between the fitting and a proximal end of the orifice member.

2. The pilot assembly of claim 1, wherein the pilot hood is removable to permit access to the orifice member.

3. The pilot assembly of claim 1, wherein the compressible member is a disc spring.

4. The pilot assembly of claim 1, wherein the compressible member is circular and provides a preset sealing force which is automatically duplicated upon subsequent compression by the fitting when the fitting is torqued to a predetermined value.

5. The method of assembling a quick change pilot assembly, comprising the steps of:
   a) attaching front side components, including at least a pilot hood, and hood mounting plate;
   b) attaching a lock sleeve and fitting receiving member to the pilot mounting plate;
   c) disposing a desired orifice member into a lock sleeve disposed inside the lock sleeve and fitting receiving member;
   d) inserting into a threaded end of the lock sleeve and fitting receiving member a pilot line bearing a compression seal member circumjacent an end thereof and a fitting having threads mating the threaded end; and
   e) joining the fitting and the lock sleeve and fitting receiving member by their respective threaded ends to compress and seal the orifice member and lock sleeve member against a disc spring seal.

6. The method of claim 5, further including the step of tightening the fitting to a predetermined torque value to provide a predetermined value of compression against the disc spring.

* * * * *